United States Patent [19]

Nakura et al.

[11] Patent Number: 4,879,144
[45] Date of Patent: Nov. 7, 1989

[54] LIQUID CRYSTAL ELEMENT

[75] Inventors: Yoshiyuki Nakura, Kawasaki; Yasuo Kato, Yokohama, both of Japan

[73] Assignee: Canon Kabushiki Kaisha, Tokyo, Japan

[21] Appl. No.: 333,771

[22] Filed: Apr. 6, 1989

Related U.S. Application Data

[63] Continuation of Ser. No. 828,281, Feb. 11, 1986, abandoned.

[30] Foreign Application Priority Data

Feb. 19, 1985 [JP] Japan .................................. 031040

[51] Int. Cl.$^4$ ................................. G02F 1/13
[52] U.S. Cl. ........................................ 428/1; 350/341; 350/350 S
[58] Field of Search ................. 428/1; 350/341, 350 S

[56] References Cited

U.S. PATENT DOCUMENTS

| | | | |
|---|---|---|---|
| 4,068,923 | 1/1978 | Toida | 428/1 |
| 4,367,924 | 1/1980 | Clark et al. | 350/350 X |
| 4,456,638 | 6/1984 | Petcavich | 428/1 |
| 4,561,725 | 12/1985 | Hotta | 350/341 |
| 4,615,919 | 10/1986 | Inoue et al. | 428/1 |
| 4,618,514 | 10/1986 | McClelland et al. | 428/1 |
| 4,729,637 | 3/1988 | Sato et al. | 350/339 F |

FOREIGN PATENT DOCUMENTS 56-25714  3/1981  Japan .
1490110 10/1977  United Kingdom .
2111285  6/1983  United Kingdom .

*Primary Examiner*—Marion C. McCamish
*Attorney, Agent, or Firm*—Fitzpatrick, Cella, Harper & Scinto

[57] ABSTRACT

A liquid crystal element comprises a cell structure where a liquid crystal is disposed between a pair of electrode substrates, a first electrode substrate of said pair of electrode substrates having a first resin layer formed at the surface contacting the liquid crystal of the first electrode substrate by thermal curing resulted from dehydration ring closure, the first resin layer being able to control orientation of the liquid crystal, and a second electrode substrate having a second resin layer formed at the surface contacting the liquid crystal of the second electrode substrate by thermal curing at a temperature lower than that at which the first resin layer is formed, the second resin layer being able to control orientation of the liquid crystal.

15 Claims, 2 Drawing Sheets

LIQUID CRYSTAL ELEMENT

This application is a continuation of application Ser. No. 828,281, filed Feb. 11, 1986, now abandoned.

BACKGROUND OF THE INVENTION

1. Field of the Invention

This invention relates to a liquid crystal element using a particular orientation film, and more particularly, to a twisted nematic liquid crystal element constituted of an electrode substrate, a dyed filter and the particular orientation film successively laminated in this order, or to a ferroelectric liquid crystal element.

2. Description of the Related Art

In a liquid crystal television panel using a conventional active matrix driving system, a thin film transistor (TFT) is connected to each picture element in a matrix state, a gate-on-pulse is applied to the TFT to conduct between the source and the drain, and at this time, and image signals are applied from the source and accumulated in a capacitor. The liquid crystal (for example, twisted nematic-TN liquid crystal) is driven corresponding to the accumulated image signals. Then, a color filter layer fitted to each picture element is subjected to optical switching to effect color display.

U.S. Pat. No. 4,367,924 to Clark and Lagerwall discloses a bistable ferroelectric liquid crystal (FLC) element. It has been tried to apply the ferroelectric liquid crystal element to a color display. Heretofore, in case of a liquid crystal element containing a color filter formed with a dyed layer at the electrode surface side, a dyeing medium and a material having a sufficient heat resistance for dyeing can not be selected. Therefore, the color filter is not thermally stable and the heat curing temperature at which an orientation controlling film is formed on the color filter is limited.

As a result, one method to overcome the above problem is that an orientation treatment such as a rubbing treatment is applied directly to the surface of the color filter so that the above-mentioned orientation controlling film is omitted. However, the inventors have found problems occur as shown below.

FIG. 1A shows a driving wave shape applied to picture elements of a ferroelectric liquid crystal.

FIG. 1B shows a voltage wave shape impressed to a liquid crystal itself at real time. That is, when a writing pulse, $V_{ON}$, is applied to the ferroelectric liquid crystal from the opposing cross electrodes, the voltage wave shape substantially applied to the ferroelectric liquid crystal is as shown in FIG. 1B. That is, $V_0$ upon applying a pulse is decrease by $\Delta V_0$ at a rate of the time constant, $\tau = RC$ (R: resistance of FLC, C: capacitance of FLC). The less the resistance R, the larger the voltage drop, $\Delta V_0$, and upon switching the pulse (upon trailing of pulse), $-\Delta V_0$ of an opposite polarity is applied to the FLC. When this $|-\Delta V_0|$ is larger than the reverse threshold voltage $|-V_{th}|$, for example, writing of black (opposite to writing of white) is effected. This is attributable to an electric field of an opposition direction $(-\Delta V_0)$ generated by discharge from capacitance of the dielectric member layer such as an orientation controlling film connected to the ferroelectric liquid crystal in series upon trailing of pulse.

Therefore, there is the following problem. As mentioned above, the liquid crystal element for color display contains color filters in the cell, and the dye in the color filter is dissolved in the ferroelectric liquid crystal. When such liquid crystal element is used for a long time, resistance R of the ferroelectric liquid crystal is lowered with the lapse of time until at last the value of the above-mentioned electric field of the opposite direction $(-\Delta V_0)$ exceeds the reverse threshold voltage resulting in the inoperativeness of the desired electro-optical switching.

When a row-subsequent writing system is applied to a ferroelectric liquid crystal element, there is, for example, a system wherein a pulse forming a first display state based on a first orientation state of a ferroelectric liquid crystal at phase $t_1$ (becoming a first phase) is applied to all or some predetermined picture elements on row, and then a pulse capable of reversing a first display state to a second display state based on a second orientation state is applied to a picture element selected by phase $t_2$ (which is to become the second phase).

According to this system, at phase $t_2$, a pulse having a voltage less than the threshold voltage and of a polarity opposite to the pulse applied at phase $t_1$ is applied to a picture element maintained at a first display state as shown in FIG. 2A.

In the case of row-subsequent writing system, it is necessary that the display state written at phase $t_1$ is maintained without being reversed at phase $t_2$. Therefore, aa voltage larger than the reverse threshold voltage is not to be applied at phase $t_2$, however, as the result of the present inventors' study, the following problem has been found. That is, upon changing the pusle polarity from phase $t_1$ to phase $t_2$, a voltage of $-(\alpha V_0 + \Delta V_0)$ where $a < |V_{th}|/|V_{ON}|$ and $V_{th}$ is a threshold voltage of the ferroelectric liquid crystal, is substantially applied to the liquid crystal layer as shown in FIG. 2B, and when $-(\alpha V_0 + \Delta V_0)$ is larger than the reverse threshold voltage, the picture element which is to maintain the first display state is reversed to the second display state at phase $t_2$ resulting in that the desired display can not be formed.

When a ferroelectric liquid crystal element is prepared, it is practically difficult to form a monodomain showing bistability. Nonetheless, it has been demanded that an orientation controlling film of high performance be capable of not forming multidomain or single stable domain and, further, that the formation of monodomain showing bistability be free from orientation defect.

However, when an orientation controlling film for ferroelectric liquid crystal reported or published up to now is used, there is a tendency to form orientation defects and multidomain portions and single stable domain. portions coexist together with bistable domains.

SUMMARY OF THE INVENTION

An object of the present invention is to provide a liquid crystal element free from the above-mentioned drawbacks.

Another object of the present invention is to provide a liquid crystal element having a high reliability even though a dyed layer is contained therein.

According to the present invention, there is provided a liquid crystal element comprising a cell structure where a liquid crystal is disposed between a pair of electrode substrates, a first electrode substate of said pair of electrode substrates having a first resin layer formed at the surface contacting the liquid crystal of the first electrode substrate by thermal curing resulted from dehydration ring closure, the first resin layer being able to control orientation of the liquid crystal, and a second electrode substrate having a second resin layer formed at the surface contacting the liquid crystal of the second electrode substrate by thermal curing at a temperature lower than that at which the first resin layer is formed, the second resin layer being able to control orientation of the liquid crystal.

DESCRIPTION OF THE PREFERRED EMBODIMENTS

Figure 1A:
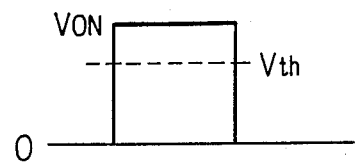
FIG. 1A and FIG. 1B show voltage wave shapes upon writing.
Figure 1B:
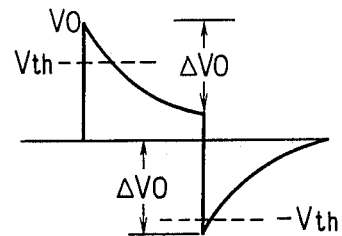
Figure 2A:
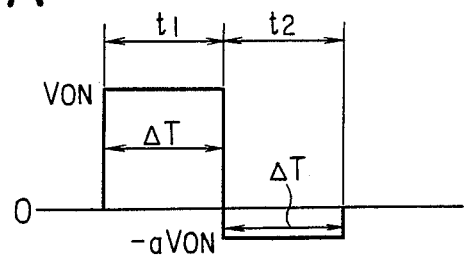
FIG. 2A and FIG. 2B show voltage wave shapes upon another writing.
Figure 2B:
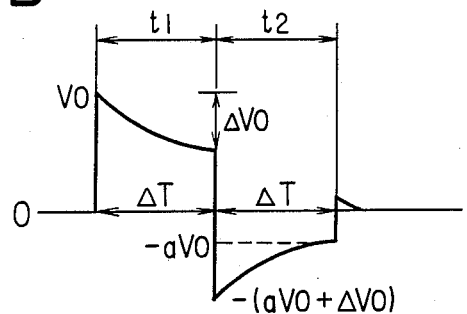
Figure 3:
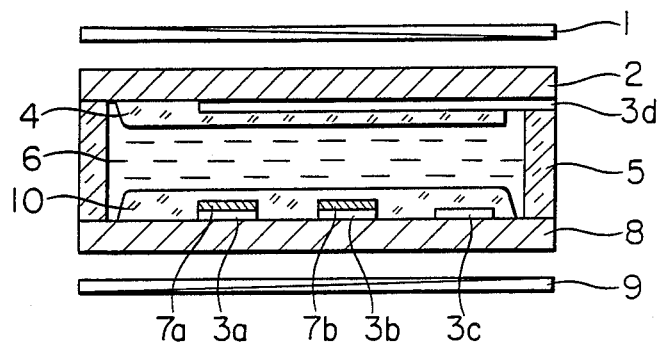
FIG. 3 is a schematic cross section of a liquid crystal element of the present invention.

FIG. 3 shows a cross sectional view of a liquid crystal display device containing a dyed filter layer used in the present invention.

The embodiment in FIG. 3 uses a twisted nematic (TN) liquid crystal. 1 is a polarizing plate, 2 a transparent substrate, 3d a transparent electrode, 4 an orientation controlling film according to the present invention, 5 a sealing material which also functions as a spacer, 6 a liquid crystal, 7a and 7b are dyed filter layer, 3a, 3b and 3c are segment type electrodes, 10 is an orientation controlling film according to the present invention, 8 a transparent substrate and 9 a polarizing plate or a polarizing plate provided with a reflecting plate.

According to the present invention, dyed layers 7a and 7b are provided on transparent electrodes 3a and 3b, respectively, and an orientation controlling film 10 which also can function as a protecting layer is provided on the dyed layers. As the materials for the dyed layers and orientation controlling film, it is not necessary to use particular materials of high heat resistance, but materials capable of being easily processed and desired colored layers can be selected. This is a feature of the present invention. According to the present invention, there is preferably used a film produced by heating an orientation film solution composed of polyvinyl alcohol and organic titanium at a weight ratio of 1:2, or more at a temperature not higher than 220° C. for 2 hours or less.

The film thickness is preferably 600–2000 Å. As organic titanium, there may be used Ti(OR)₄ where R is alkyl such as methyl, ethyl, propyl, butyl, amyl and the like, and a chelated titanium such as Ti(OH)₂[OCH(CH₃)COOH]₂.

As the polyvinyl alcohol used, polyvinyl alcohol having a degree of polymerization of 1000–3000 and a degree of saponification of 98–100% is preferably employed.

As another protecting layer, there may be used a polyether amide capable of being shaped at a temperature lower than the thermal curing temperature by dehydration ring closure, and of good orientation control to the liquid crystal, and having a recurring unit of the following Formula (1),

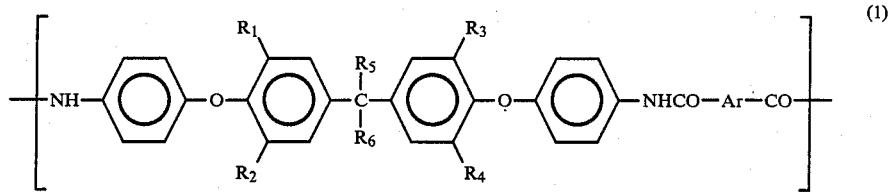

where $R_1$, $R_2$, $R_3$ and $R_4$ are selected from hydrogen, straight or branched lower alkyl such as methyl, ethyl, propyl, butyl and the like, lower alkoxy such as methoxy, ethoxy, propoxy, butoxy and the like, and halo such as chloro, bromo and the like; $R_5$ and $R_6$ are selected from hydrogen and lower alkyl such as methyl, ethyl, propyl and the like; and Ar is arylene such as p-phenylene, m-phenylene and the like.

As an organic solvent for polyether amides, there may be mentioned alcohols such as methanol, ethanol, isopropanol and the like, ketones such as acetone, methyl ethyl ketone, cyclohexanone and the like, amides such as N,N-dimethylformamide, N,N-dimethylacetamide and the like, sulfoxides such as dimethyl sulfoxide and the like, ethers such as tetrahydrofuran, dioxane, ethyleneglycol monomethyl ether and the like, esters such as methyl acetate, ethyl acetate, and the like, halogenated aliphatic hydrocarbons such as chloroform, methylene chloride, dichloroethylene, carbon tetrachloride, trichloroethylene, and the like, and aromatic compounds such as benzene, toluene, xylene, ligroin, monochlorobenzene, dichlorobenzene and the like.

As an example of the polyether amide, "HL-1100" (tradename, manufactured by Hitachi Kasei K.K.) may be used.

As an orientation controlling film 4 used for the substrate, a film having polyimide bond formed by dehydration ring closure at a high temperature may be used. The film may be produced by subjecting a polyamide acid to dehydration ring closure at a curing temperature of 220° C. or higher and making into a film of, usually, 600–2000 Å and preferably 800–1500 Å.

As the polyamide, there may be used polymers having a recurring unit of Formula (2) or (3) below:

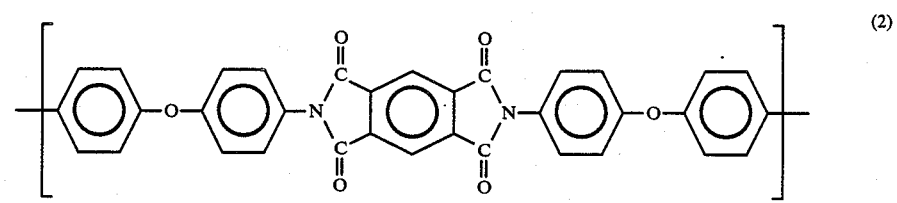

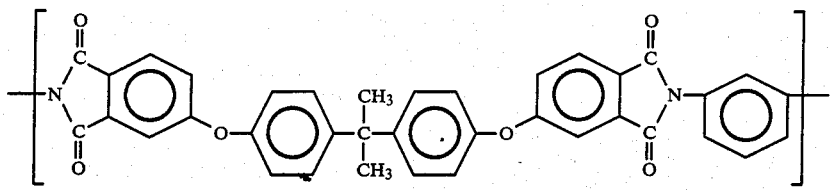

Before forming the polyimide film, there may be formed preliminarily on the electrode substrate an organosiloxane film produced with the silane coupling agent such as H₂NC₂H₄NHC₃H₆Si(CH₃)(OCH₃)₂, H₂NCH₂CH₂CH₂Si(OC₂H₅)₃, H₂NC₂H₄NHC₃H₆Si(OCH₃)₃ and the like. The following examples are given for illustrating the present invention.

EXAMPLE 1

An electrode plate having a transparent electroconductive coating composed of indium oxide in a predetermined pattern was coated with a 5% aqueous solution of polyvinyl alcohol (manufactured by Nihon Gosei Kagaku K.K.) by using a spinner, the polyvinyl alcohol thus coated was then cured, and a resist material was applied to the coating following by a predetermined patterning and removing the unnecessary polyvinyl alcohol. The electrode plate having a pattern of the polyvinyl alcohol film as prepared above was soaked in a dyeing bath (a 10 wt.% aqueous solution of a copper containing trisazo dye (Sumilite Supra C G L Gray, tradename, produced by Sumitomo Kagaku K.K.)) to dye the polyvinyl alcohol film. To one liter of a 7 wt.% aqueous solution of polyvinyl alcohol was added 14 g of an organic titanium, Ti(OH)₂[OCH(CH₃)COOH]₂, and was sufficiently mixed with 0.8 l of ethylene glycol. The resulting mixture was used as an orientation liquid, applied to the electrode plate having the dyed layer by means of a spinner, and allowed to stand in a clean oven at 200° C. to cure. The film thickness of the resulting cured orientation film of polyvinyl alcohol was measured by an alpha step film thickness measuring instrument (Alpha-step 200, tradename, manufactured by TENCOR INSTRUMENTS Co.) and it was 1200 Å.

To an electrode plate having an electrode pattern (common pattern) which paired the above-mentioned electrode pattern (segment pattern) was applied an aminosilane coupling agent, a 10 wt/% solution of H₂NC₂H₄NHC₃H₆Si(CH₃)(OCH₃)₂ (KBM 602, tradename, produced by Shinetsu Kagaku K.K.) in isopropyl alcohol using a spinner, cured in an oven, and then a 5 wt.% solution of polyamide acid (a condensate of pyromellitic dianhydride and 4,4'-diphenyldiaminoether) in N-methylpyrrolidone for forming a polyimide film of Formula (2) above was applied to by using a spinner, and allowed to stand in a clean oven at 300° C. to cure a polyimide film by dehydration ring closure. Then, each electrode plate was rubbed in one direction with a felt sheet to effect a rubbing orientation treatment. The rubbing direction for the electrode plates were perpendicular to each other. Then, the electrode plates were adhered with an epoxy type resin adhesive and a nematic liquid crystal, "ZLI" (tradename, produced by Merck) was poured into the space between the electrode plates followed by sealing, sufficiently washing and drying, and then a polarizing plate was adhered to the outside of the electrode plate to fabricate a liquid crystal displaying device.

EXAMPLE 2

In place of an orientation liquid comprising a mixture of polyvinyl alcohol/organic titanium, a polyetheramide type material of Formula (1) above, HL-1100 (tradename, produced by Hitach Kasei K.K.) was applied to by using a spinner, and then cured at 100° C. for 30 min. When measured by an alpha step film thickness measuring instrument, the resulting film was 800 Å. Then a cell was fabricated following the procedures of Example 1.

EXAMPLE 3

Following the procedures of Example 1 except that a dyed layer was formed at the side of an electrode substrate having a common pattern, the organic titanium/polyvinyl alcohol film used in Example 1 was formed on said electrode substrate, and the polyimide film used in Example 1 was formed on a segment pattern, there was fabricated a cell.

COMPARISON EXAMPLE 1

Following the procedures of Example 1 except that the organic titanium/polyvinyl alcohol film as used in Example 1 was applied to both electrode substrates, there was fabricated a cell.

COMPARISON EXAMPLE 2

Following the procedures of Example 1 except that the polyimide film curing at 300° C. as in Example 1 was applied to both electrode substrates, there was fabricated a cell.

100 pieces of each of cells fabricated in Examples 1-3 and Comparison Examples 1-2 were produced, and the electric current upon applying a voltage to each cell was measured at 80° C. and 95% of relative humidity at 100 hours, 200 hours, 300 hours and 500 hours, and the number of measured electric current of 5 μA or more was investigated. Simultaneously the display performance in the display was observed.

The results are as shown below.

Standard of Observing the Display Performance

A: No change is observed.
B: A minor change is observed.
C: A distant change is observed.

TABLE 1

| | Measurement of Electric Current (Number of cells showing 5 μA or more) | | | |
|---|---|---|---|---|
| | 100 hrs. | 200 hrs. | 300 hrs. | 500 hrs. |
| Example 1 | 4 | 8 | 9 | 13 |
| Example 2 | 3 | 6 | 10 | 16 |
| Example 3 | 3 | 7 | 8 | 12 |
| Comparison Example 1 | 20 | 28 | 35 | 57 |
| Comparison | 4 | 6 | 12 | 21 |

TABLE 1-continued

| | Measurement of Electric Current (Number of cells showing 5 μA or more) | | | |
|---|---|---|---|---|
| | 100 hrs. | 200 hrs. | 300 hrs. | 500 hrs. |
| Exampe 2 | | | | |

TABLE 2

| | Liquid Crystal Display Performance | | | | | | | | | | |
|---|---|---|---|---|---|---|---|---|---|---|---|
| | 100 hrs. | | | 200 hrs. | | | 300 hrs. | | | 500 hrs. | | |
| | A | B | C | A | B | C | A | B | C | A | B | C |
| Example 1 | 71 | 28 | 1 | 70 | 29 | 1 | 68 | 27 | 5 | 67 | 25 | 8 |
| Example 2 | 66 | 33 | 1 | 64 | 33 | 3 | 63 | 30 | 6 | 61 | 28 | 11 |
| Example 3 | 68 | 30 | 2 | 66 | 31 | 3 | 66 | 30 | 4 | 65 | 30 | 5 |
| Comparison Example 1 | 29 | 65 | 6 | 22 | 58 | 20 | 18 | 47 | 35 | 16 | 48 | 36 |
| Comparison Example 2 | 34 | 61 | 5 | 32 | 55 | 13 | 32 | 46 | 22 | 30 | 38 | 32 |

As is clear from the above results, the cell produced in each of the examples according to the present invention has improved durability as compared with the cells of the comparison examples. In Comparison Example 1 the electric current value of cell increases and therefore, the durability is problematic. In Comparison Example 2, it is considered that heating is effected at 300° C. so that the dye is faded by heat and it is clear from Table 2 that the display performance is lowered.

According to the present invention, as the liquid crystal 6, there may be used ferroelectric liquid crystals disclosed in U.S. Pat. No. 4,367,794 other than the above-mentioned TN liquid crystal. In particular, upon producing monodomain of a chiral smectic phase of non-spiral structure giving bistability, monodomain of good bistability can be obtained when the orientation controlling film formed on one electrode substrate is made of a cured film produced by a thermal cross-linking reaction and that formed on the other electrode substrate is made of a cured film produced by a thermal dehydration ring closure reaction.

In addition, according to the present invention, there may be used a ferroelectric liquid crystal showing chiral smectic I, J, K, G or F phase as well as chiral smectic C or H phase.

EXAMPLE 4 p-Desiloxybenzylidene-p'-amino-2-methylbutyl cynnamate (DOBAMBC) heated isotropically was poured into a cell as prepared in Example 1 except that the distance between the electrode substrates was 2 μm and the direction of rubbing treatment applied to the upper and lower electrode substrates was parallel to the corresponding orientation treating axis, and then sealed. The cell was gradually cooled at a rate of 2° C./hour to effect successively a phase transition from a smectic A phase to a chiral smectic C phase resulting in the formation of a chiral smectic phase at 63° C. Observation by a polarizing microscope revealed that good monodomain showing bistability was formed in the ferroelectric liquid crystal cell.

The ferroelectric liquid crystal cell was repeatedly subjected to the tests as mentioned in the previous Examples, and similar results were obtained.

Tests similar to those in Comparison Examples 1 and 2 were conducted with respect to DOBAMBC, and thereby good monodomain was not produced and the domain showed only monostability.

EXAMPLE 5

Two sheets of a square glass substrate provided with a stripe-like ITO film of 62.5 μm wide at a pitch of 100 μm were prepared. One glass substrate was set in a vacuum vapor deposition apparatus such that the side having the ITO film faced downward, and a copper phthalocyanine pigment was deposited. The resulting copper phthalocyanine pigment deposited layer to be a color filter was patterned by a predetermined photolithographic process. To one liter of a 7 wt.% aqueous solution of polyvinyl alcohol was added 14 g of an organic titanium, $Ti(OH)_2[OCH(CH_3)COOH]_2$, and was sufficiently mixed with 0.8 l of ethylene glycol. The resulting mixture was used as an orientation liquid, applied to the electrode plate having the color filter by means of a spinner, and allowed to stand in a clean oven at 200° C. to cure. The film thickness of the resulting cured film of polyvinyl alcohol was measured by an alpha step film thickness measuring instrument (Alphastep 200, tradename, manufactured by TENCOR INSTRUMENTS Co.) and it was 1200 Å.

Then, the surface of the polyvinyl alcohol film was subjected to a rubbing treatment with velvet in the direction parallel to the direction of the stripe electrode and this was used as "A" electrode plate.

To the other glass substrate was applied an aminosilane coupling agent, a 10 wt.% solution of $H_2NC_2H_4NHC_3H_6Si(CH_3)(OCH_3)_2$ (KBM 602, tradename, produced by Shinetsu Kagaku K.K.) in isopropyl alcohol by using a spinner, cured in an oven, and then a 5 wt.% solution of polyamide acid (a condensate of pyromellitic dianhydride and 4,4'-diphenyldiaminoether) in N-methylpyrrolidone for forming polyimide film of Formula (2) above was applied to by using a spinner, and allowed to stand in a clean oven at 300° C. to cure a polyimide film by dehydration ring closure.

The surface of the polyimide film was subjected to a rubbing treatment with velvet in the direction perpendicular to the direction of the stripe electrode and this was used as "B" electrode plate.

A thermosetting epoxy adhesive was applied to the circumference portion of A electrode plate except a portion to be a pouring port by a screen printing method, and then, A electrode plate was superposed on B electrode at a distance of 2 μm held by a spacer such that their stripe pattern electrodes were crossed at right angles to each other, that is, the orientation treating axes corresponding to the rubbing treatment directions, respectively, were parallel to each other.

Into the cell thus prepared was poured the following liquid crystal composition A (showing SmC* at 20 −78° C.) in an isotropic phase through a pouring port, which was then sealed. The cell was gradually cooled to a low temperature, and kept at 40° C. while a pair of polarizers were provided at a cross nicol state. When the state was observed by a microscope, it was found that there was a non-spiral structure free from orientation defects and there was formed SmC* (chiral smectic C phase) of monodomain.

Liquid Crystal Composition A

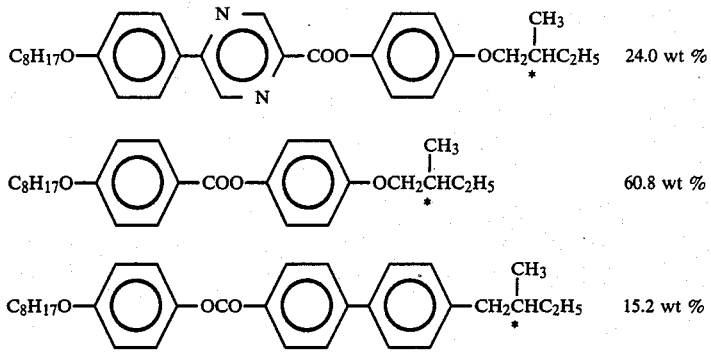

24.0 wt %

60.8 wt %

15.2 wt %

COMPARISON EXAMPLE 3

Repeating the procedures of Example 5 except that the polyvinyl alcohol film of A electrode plate used when the liquid crystal element of Example 5 was produced was omitted, there was produced a liquid crystal cell for comparison and thus, SmC* of monodomain was obtained in a similar way.

Liquid crystal cells of the above-mentioned Example 5 and Comparison Example 3 were allowed to stand at 80° C. and relative humidity of 60% for 96 hours, and resistances of the liquid crystals were measured. The results are shown in Table 3 below.

TABLE 3

|  | Resistance before allowing to stand | Resistance at 96 hours after allowing to stand |
| --- | --- | --- |
| Example 5 | $3.1 \times 10^{10}$ ohm.cm | $3.1 \times 10^{10}$ ohm. cm |
| Comparison Example 3 | $3.1 \times 10^{10}$ ohm.cm | $2.2 \times 10^{7}$ ohm. cm |

Figure 4:
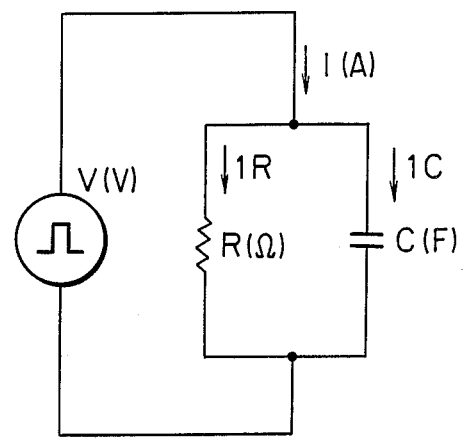
FIG. 4 is a circuit for measuring resistance.

The above-mentioned resistance ohm.cm was measured by applying rectangular pulse according to a two frequency method using the circuit of FIG. 4 and calculating $R_{LC}$(ohm.cm) by the following formula. In the following, $f_1 = 32$ Hz, $f_2 = 64$ Hz and $V = 10$ volt.

$$I = I_C + I_R = 4f \cdot C \cdot V + \frac{V}{R_{LC}}$$

V: Voltage for measurement
f: Frequency of rectangular wave
$I_C$: Volue of current of capacitance component
$I_R$: Value of current of R component
$C_{LC}$: Capacitance of liquid crystal
$R_{LC}$: Resistance (ohm) of liquid crystal
$C_{LC} = R_{LC}S/d$
d: Film thickness of liquid crystal (cell gap)
S: Electrode area
Changing f, $$I_1 = 4f_1 \cdot C_{LC} \cdot V + \frac{V}{R_{LC}}$$

$$I_2 = 4f_2 \cdot C_{LC} \cdot V + \frac{V}{R_{LC}}$$

Then, after standing for 96 hours, a cross nicol polarizer was fitted to each liquid crystal display cell, and a 20 volt signal was applied between the electrodes to effect a linear subsequent driving. As a result, in case of the liquid crystal cell of the Example of the present invention, a display quality having a contrast as good as the initial time while in case of the liquid crystal cell of the Comparison Examples any normal display was not obtained. The reason is considered that $-\Delta V_O$ generating upon trailing of the applied pulse is applied to the liquid crystal.

EXAMPLE 6

In place of the orientation liquid of a mixture of polyvinyl alcohol/organic titanium used when A electrode plate of Example 5, HL-1100 (tradename, produced by Hitachi Kasei K.K.) of polyether amide type represented by Formula (1) above was applied by a spinner, and then curing was effected at 100° C. for 30 min. The film thickness was 800 Å when measured by an alpha step film thickness measuring instrument. A cell was fabricated following the procedures of Example 5.

The cell thus fabricated was measured by a method as employed in Example 5 and a result similar to that of Example 5 was obtained.

EXAMPLE 7

Repeating the procedure of Example 5 except that a polyimide film of Formula (3) above was used in place of the polyimide film employing for producing the B electrode of Example 5, there was fabricated a liquid crystal cell. The cell was measured by a method used in Example 5 and a result similar to that of Example 5 was obtained.

According to the constitution of the present invention, at the dyed filter layer side it is easy to select the filter material and the orientation film. On the contrary, at the other substrate, there is used an orientation film of high humidity resistance and high insulating property simultaneously with functioning as a protecting film so that a display device having a desired colored layer can be produced with a high reliability and moreover, the fabrication is easy.

In addition, it is desirable that the cell is constructed at a temperature not higher than 220° C. so as to use the dye for coloring stably, and thus the dyed portion can be kept stable for a long time.

In view of the foregoing, the present invention can give a stable color display even when used for a long time as a liquid crystal element for color display, in particular, color television display. Particularly, when color filter layers are fitted to a conventional dot matrix type liquid crystal element using twistic nematic (TN) and a protecting layer as mentioned above is omitted, the resistance is lowered in the TN liquid crystal layer, but, upon trailing of writing pulse, the display state does not become different from that of the writing information.

On the contrary, in case of FLC the generation of an opposite electric field due to discharge of a dielectric member layer upon decrease of the writing pulse is attributable to writing with an information different from the writing information, and therefore, this is a big problem for color display using FLC, but according to the present invention, the problem can be effectively solved.

What is claimed is:

1. A liquid crystal element, comprising:
a pair of transparent substrates including a first substrate having disposed thereon a transparent electrode and an orientation controlling film and a second transparent substrate having disposed thereon a transparent electrode and an orientation controlling film:
a ferroelectric liquid crystal disposed between the pair of substrates, wherein at least one of the first or second substrates further comprises a color filter having a protecting layer which prevents the color filter from directly contacting the ferroelectric liquid crystal, said orientation controlling films comprising materials which are independently selected from the group consisting of polymides, polyvinyl alcohols and polyether amides.

2. The liquid crystal element according to claim 1 in which the ferroelectric liquid crystal is a chiral smectic phase.

3. The liquid crystal element according to claim 1 in which the ferroelectric liquid crystal is a chiral smectic phase of non-spiral structure.

4. The liquid crystal element according to claim 1 in which the protecting layer comprises a resin layer.

5. The liquid crystal element according to claim 1 in which the protecting layer is disposed at a position where the protecting layer directly contacts the ferroelectric liquid crystal and comprises a resin film capable of controlling the orientation of the ferroelectric liquid crystal.

6. The liquid crystal element according to claim 1 in which the protecting layer is 600-2000 Å thick.

7. A liquid crystal element according to claim 1, wherein said protecting layer on one of the pair of the substrates serves as an orientation controlling film and is composed of a polyvinyl alcohol, and the other substrate is provided with an orientation controlling film thereon composed of a polyimide.

8. The liquid crystal element according to claim 7 in which the polyvinyl alcohol film is a film cured in the presence of a cross-linking agent.

9. The liquid crystal element according to claim 8 in which the cross-linking agent is an organic titanium compound.

10. The liquid crystal element according to claim 7 in which the orientation treating axes of the orientation controlling films are parallel to each other.

11. The liquid crystal element according to claim 10 in which each of the orientation treating axes is a rubbing treating axis.

12. A liquid crystal element according to claim 1, wherein said protecting layer on one of the pair of the substrates serves as an orientation controlling film and is composed of a polyether amide, and the other substrate is provided with an orientation controlling film thereon composed of a polyimide.

13. A liquid crystal element according to claim 12, wherein said orientation controlling film composed of a polyether amide has a recurring unit of the formula:

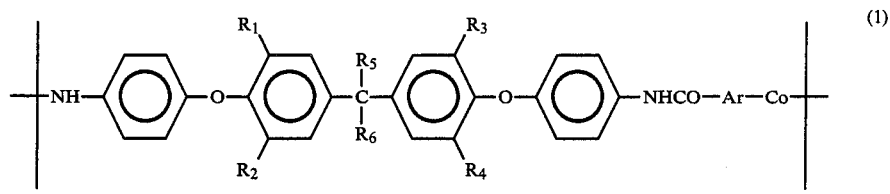

where $R_1$, $R_2$, $R_3$ and $R_4$ are selected from the group consisting of hydrogen, straight or branched chain lower alkyl, lower alkoxy and halogen, $R_5$ and $R_6$ are hydrogen or lower alkyl, and Ar is arylene.

14. A liquid crystal element according to claim 12, wherein said orientation controlling film composed of a polyimide has a recurring unit of the formula:

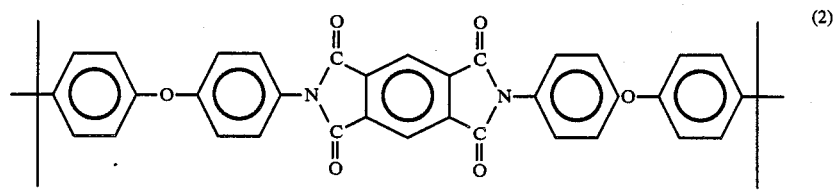

15. A liquid crystal element according to claim 12, wherein said orientation controlling film composed of a polyimide has a recurring unit of the formula:

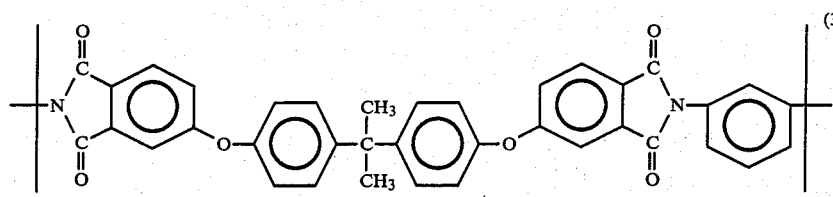

UNITED STATES PATENT AND TRADEMARK OFFICE
CERTIFICATE OF CORRECTION

PATENT NO. : 4,879,144
DATED : November 7, 1989
INVENTOR(S) : YOSHIYUKI NAKURA ET AL.     Page 1 of 2

It is certified that error appears in the above-identified patent and that said Letters Patent is hereby corrected as shown below: Title page:

Item: [57] ABSTRACT

Line 6, "resulted" should read --resulting--.

COLUMN 2

Line 26, "aa" should read --a--.

COLUMN 4

Line 56, "polyamide" should read --polyimide--.

COLUMN 5

Line 62, "direction" should read --directions--.

COLUMN 6

Line 51, "number of measured electric current of 5µA or more" should read --number of cells showing a measured electric current of 5µA or more--.

COLUMN 11

Line 18, "film:" should read --film;--.

UNITED STATES PATENT AND TRADEMARK OFFICE
CERTIFICATE OF CORRECTION

PATENT NO. : 4,879,144
DATED : November 7, 1989
INVENTOR(S) : YOSHIYUKI NAKURA ET AL.

Page 2 of 2

It is certified that error appears in the above-identified patent and that said Letters Patent is hereby corrected as shown below:

COLUMN 12

Line 22, "treating" should read --treated--.

Signed and Sealed this

Eleventh Day of October, 1994

Attest:

BRUCE LEHMAN

Attesting Officer

Commissioner of Patents and Trademarks